Aug. 23, 1966  J. E. MALONEY  3,267,681
METHOD OF CONSTRUCTING INSULATED CONDUIT
Original Filed May 3, 1961  2 Sheets-Sheet 1
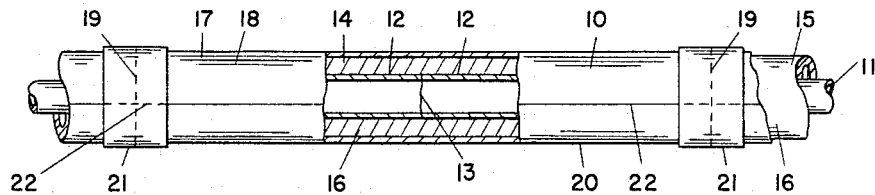
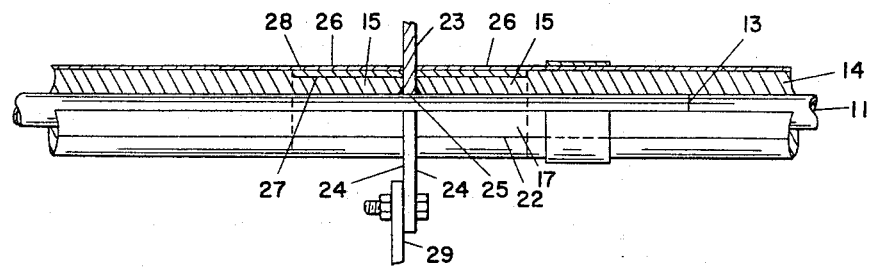
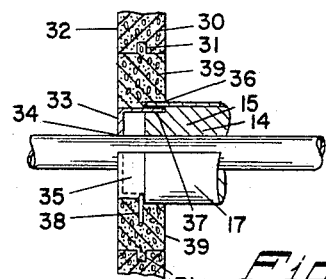
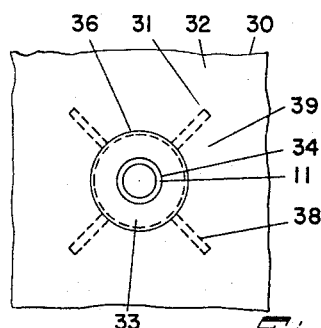
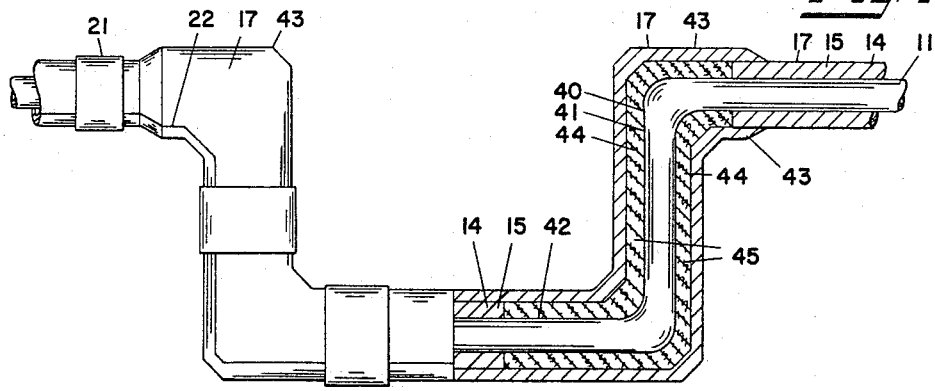
INVENTOR.
JAMES E. MALONEY
BY Joseph G. Werner
ATTORNEY

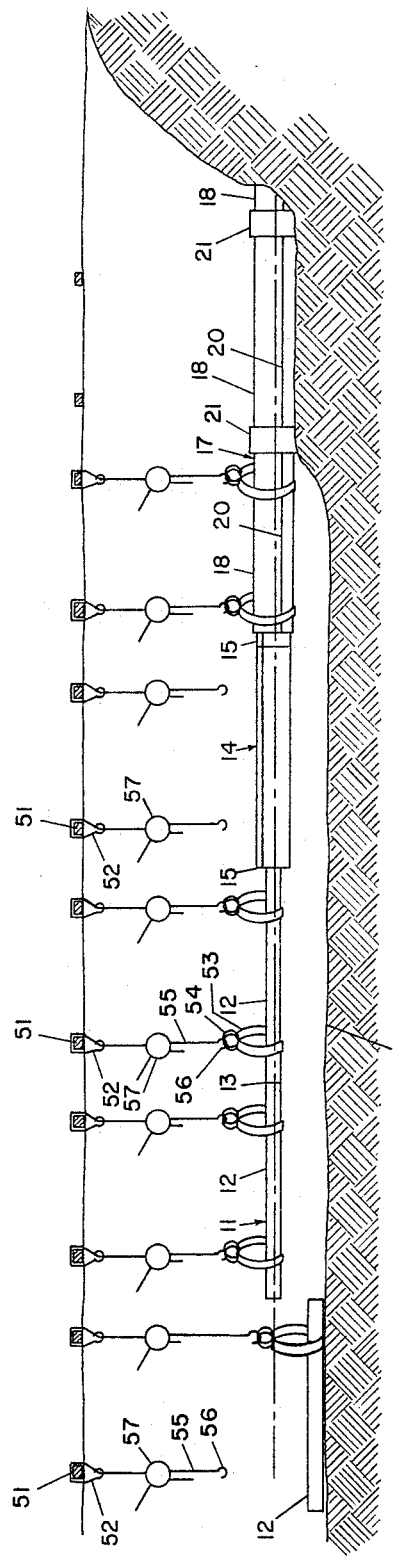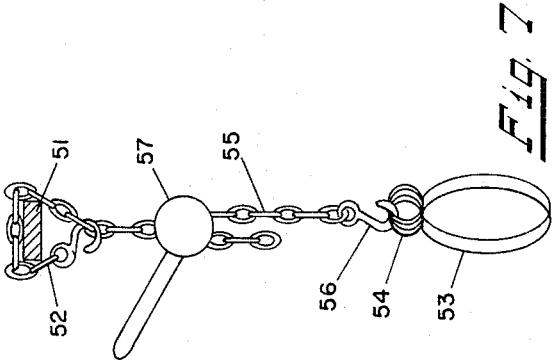

United States Patent Office 3,267,681
Patented August 23, 1966

3,267,681
METHOD OF CONSTRUCTING INSULATED CONDUIT
James E. Maloney, Rte. 3, Madison, Wis.
Original application May 3, 1961, Ser. No. 107,525, now Patent No. 3,144,050, dated Aug. 11, 1964. Divided and this application Dec. 9, 1963, Ser. No. 328,806
4 Claims. (Cl. 61—72.1)

This invention relates to improvements in insulated conduit systems and methods of constructing the same. The present application is a division of my copending application S.N. 107,525, filed May 3, 1961, now Patent No. 3,144,050.

Previous attempts to produce a satisfactory insulated conduit system have all resulted in products which possess one or more of several characteristic disadvantages. The principal disadvantage shared by all of the insulated conduit systems now in use is their high cost of materials and construction. Another disadvantage of most previous systems is the degree of specialized skill needed to construct the systems, often requiring trained factory personnel to supervise the construction. Another common disadvantage of the insulated conduit systems presently in use is their incomplete design, thus requiring the use of additional materials and fittings to construct an operational system. A still further disadvantage of most of the insulated conduit systems now in use is the difficulty and expense of replacement and repairs.

My invention has eliminated these and other existing disadvantages. It is a primary object of my invention to provide an effective insulated conduit system which can be constructed and maintained at a greatly reduced cost with fewer materials, less excavation and less labor than is required of conventional systems.

It is a further object of my invention to provide an insulated conduit system which can be efficiently and completely constructed at the job site by a contractor of normal skill and experience.

It is a still further object of my invention to provide an insulated conduit system which is a combination of standard construction materials with which the contractor is thoroughly familiar.

A still further object of my invention is to provide a method for constructing an insulated conduit system which can be sealed off as the construction progresses.

Other objects and advantages of the invention will be apparent from the following detailed explanation taken in conjunction with the accompanying drawings wherein a preferred embodiment of the principle of the invention has been selected for exemplification.

In the drawings:

FIG. 1 is an elevation view of a portion of an insulated conduit of my invention, with parts broken away.

FIG. 2 is a half-section view of an anchor for my invention.

FIG. 3 is a half-section view of a wall entrance cover plate with the wall shown in full section.

FIG. 4 is an end view of the cover plate shown in FIG. 3.

FIG. 5 is a part plan or elevation, part section view of an expansion loop for my insulated conduit system.

FIG. 6 is a sectional view of an excavation illustrating the various steps of my method for constructing an insulated conduit therein.

FIG. 7 is an enlarged view showing in more detail lifting means suitable for use with my method.

Referring more particularly to the drawings in which like numbers refer to like parts, FIG. 1 illustrates the insulated conduit system 10 of my invention adopted for use as an underground heating or cooling conduit system. However, it is to be understood that my invention is equally well suited for other uses including the insulated conduction of any fluids, both below and above ground level.

My insulated conduit 10 has a continuous conduit 11 comprised of pipes 12 which are fastened together in end to end abutment, preferably by means of circumferential butt welds 13. A tubular casing 14 consisting of rigid sections 15 of heat insulating material 16 encompases the conduit 11 in slidable contact. The heat insulating material 16 may be any structurally rigid insulating material, of which "Kaylo," manufactured by Owens-Corning Fiberglass Corporation, and "Fibrocel," manufactured by Johns-Manville Co., are suitable examples. The rigid sections 15 of insulating material 16 are preferably semi-circular, so that two sections 15 will encompass the conduit 11 to form a completed portion of the tubular casing 14. However, the sections 15 may be circular to entirely encompass the conduit 11, or for larger installations, several sections 15 may be required to encompass the conduit. It is to be understood that for installations requiring large diameter conduits or high insulating properties, the tubular casing 14 may consist of multiple layers of rigid insulation sections 15. It is important that the conduit 11 be able to slide within the tubular casing 14. This will prevent damage to the tubular casing during any movement of the completed conduit 11 induced by expansion and contraction of the pipes 12 during periods of temperature change.

A protective envelope 17 surrounds the tubular casing 14 to complete the insulated conduit 10, shown in FIG. 1. The protective envelope 17 is comprised of protective strips 18, which may be made of high temperature resistant polyvinyl chloride sheeting material weighing approximately 20 ounces per square yard, or some other material having substantially similar heat resistant properties. The protective strips 18 encompass the tubular casing 14 with their sides 19 in abutment and their ends 20 overlapping. The ends 20 are preferably overlapped about three inches and sealed with an adhesive sealer 22. The abutting sides 19 of the protective strips 18 are preefrably covered with a cover strip 21 of the same material, which is also sealed with the adhesive sealer 22 to form the finished protective envelope 17, which is mechanically strong and completely water-proof. Alternatively the protective envelope may be formed from strips of such sheeting material having an adhesive sealer or coating on one side. Such material may be wound around the tubular casing 14 in overlapping relation with the adhesive coating facing inward to provide the desired mechanically strong and water-proof envelope.

FIGS. 2, 3, 4 and 5 illustrate variations of my insulated conduit 10 to produce a complete insulated conduit system. FIG. 2 shows an anchor plate 23 attached to my insulated conduit 10 to retain the conduit 11 in alignment during operation. The anchor plate 23, having a pair of sides 24, is in abutment with adjacent sections 15 of the tubular casing 14. The conduit 11 is engaged in fixed relation by the anchor plate alignment hole 25. An anchor sleeve 26, having cylindrical inner and outer surfaces 27 and 28 is attached to each side 24 of the anchor plate 23 in substantially concentric relation to the alignment hole 25. The anchor sleeves 26 encompass the adjacent tubular casing sections 15 in fixed relation as illustrated, and are in turn enclosed within the protective envelope 17 by means of the adhesive sealer 22, to prevent the entrance of any moisture. It is preferable that the dimensions of the anchor sleeve cylindrical outer surface 28 correspond to the normal outer dimensions of the tubular casing 14 so that the protective envelope 17 does not have to be modified to enclose the anchor sleeves 26. FIG. 2 shows that the outer dimensions of the portion of the tubular casing 14 encompassed by the anchor sleeves 26 are reduced to correspond to the dimensions of the inner surface 27 of the anchor sleeves. The anchor plate 23 is attached to suitable anchor means 29 to maintain the conduit 11 in alignment. The anchor plate also prevents lineal movement of the conduit and thereby controls the direction of expansion and contraction of the conduit due to temperature change.

FIGS. 3 and 4 show a cover plate 33, having a guide hole 34, attached to my insulated conduit 10 to retain the conduit 11 in alignment as it passes through a wall 30, which may be for a steam pit or a building. The cover plate 33 is preferably located flush with the inside surface 32 of the wall 30. A cover sleeve 35 substantially similar to the previously described anchor sleeves 26, and having an outside surface 36 and an inside surface 37, is attached to the cover plate 33, and extends through the keyed wall opening 31. Anchor dowels 38 extend outward from the cover sleeve outer surface 36 and into the wall plug 39, which is formed around the cover sleeve 35 and within the keyed wall opening 31 to maintain the cover plate 33 in fixed relation to the wall 30. In new wall construction, it may be preferable to eliminate the wall plug 39 and keyed opening 31 and provide for the anchor dowels to extend into the wall 30 itself. The conduit 11 extends through the guide hole 34 into the building or pit in slidable relation. The tubular casing sections 15 have reduced outer dimensions to correspond to the inside surface 37 of the cover sleeve 35, and extend within the cover sleeve 35 to terminate in abutment with the cover plate 33. The protective envelope 17 extends within the wall plug 39 to partially enclose the cover sleeve 35 and prevent any moisture from reaching the tubular casing 14. Since the cover plate 33 is maintained in a stationary position by the cover sleeve 35 and the anchor dowels 38, the guide hole 34 serves as an external guide for the conduit 11 as it enters the building or pit. If an anchor is desired at the wall entrance, the conduit may be extended through the guide hole 34 in fixed relation.

FIG. 5 illustrates an expansion loop for my insulated conduit system. The conduit 11 is shaped to form a U-shaped loop 40 having a pair of sides 41 and a bottom section 42. The tubular casing 14 is terminated near each side 41 of the loop 40 and resumes along the bottom section 42. An expansion casing 43, substantially similar in structure and material to the tubular casing 14, encases the tubular casing near each terminating point and extends along each side 41 of the U-shaped loop 40 to encase the tubular casing along the loop bottom section 42. A nonrigid insulation material 45 such as fibrous glass is located within the expansion space 44 between the conduit 11 and the expansion casing 43 along the expansion loop sides 41, as shown in FIG. 5. The non-rigid insulation material 45 will allow free movement of the conduit 11 within the expansion casing 43 as the main line of the conduit 11 expands and contracts. The expansion casing 43 is completely enclosed by the enlarged protective envelope 17. It is obvious that other configurations to provide for expansion, such as L-shaped or Z-shaped members, could be similarly constructed.

It is apparent from the description and drawings that my insulated conduit system is a complete system which will conduct the heating or cooling medium directly into the building where it will be used. It is also clear that the materials which comprise my system are materials with which all contractors are familiar as a result of their common day to day experience. Therefore, the construction of my system from ordinary construction materials requires no special skill uncommon to building contractors.

My method of constructing and installing my insulated conduit system is as follows: Excavate a ditch 50 approximately six inches deeper than desired lower side of the insulated conduit 10. Lay the required number of individual pipes 12 in the ditch, though two or more lengths of pipe 12 may first be circumferentially butt welded together and then lowered into the ditch. Place timbers 51 across the excavation at approximately eight foot intervals, or closer for larger size conduits. Throw a short chain 52 over each timber above the desired center line of the conduit 11. Place a sling 53 around the conduit beneath each short chain. Place the hook 56 of a second short chain 55 in the metal rings 54 of the sling 53. Raise the pipes to the desired level by means of chain jacks 57 used in conjunction with the short chains. Weld the pipes 12 together in end to end abutment to form a continuous conduit 11.

At this point, there are several distinct advantages to this system of installation, all resulting in a savings of cost. Elevation and grade are easily set and held with the chain jacks. The pipes 12 are easily aligned and held for welding with standard pipe aligners. In addition, the pipes 12 are easily rotated for ease in welding, thus reducing the number of position welds to a minimum.

Rigid insulation sections 15 are next applied to the conduit 11 to form one length of tubular casing 14. Wrap the protective strips 18 around the tubular casing 14 with their sides 19 in abutment and their ends 20 overlapping. Retain the protective strips in the described position by applying an adhesive sealer 22 to the overlapping ends 20. Cover the abutting sides 19 with butt joint strips 21 held in place by the adhesive sealer 22 to complete the protective envelope 17 for the length of the tubular casing 14. Additional lengths of tubular casing 14 and protective envelope 17 are added in the same manner. As the lengths of protective envelope 17 are completed, the adjacent slings are removed from the conduit 11 and repositioned around the protective envelope 17 to maintain the system 10 in the desired position. As many feet of insulated conduit as desired may be suspended in this manner. The next step is to backfill with sand, leaving the upper half of the insulated conduit 10 uncovered. The slings can now be removed and reused as the installation progresses. An air test of suitable pressure on the conduit 11 is recommended at this time. Where it is convenient, the air test should be made before adding the insulation 16. Backfilling with sand is continued to a level six inches over the top of the protective envelope 17. The remaining backfilling is by conventional means, using excavated dirt.

It is apparent from the foregoing description that construction of my insulated conduit system can progress in stages resulting in greater construction speed due to the permitted division of the work force, and allowing the job to be sealed off after each day of work. Anchors and expansion loops can be provided within my system in the conventional manner. However, because of the complete freedom of movement inherent in my system, anchors are seldom needed.

Use of my insulated conduit system and method of construction requires less materials, less excavation, and less care in making the excavation, all of which reduce the cost below that of other existing systems.

It is understood that the present invention is not confined to the particular construction and method herein described, but embraces all such modified forms thereof as come within the scope of the following claims.

I claim:

1. The method of constructing an insulated conduit for the underground distribution of fluids which comprises, excavating a ditch deeper than the desired lower line of the conduit, placing a necessary number of pipe sections in said ditch, placing a plurality of supporting members across said ditch, suspending adjustable lifting means from each of said supporting members, connecting a plurality of said lifting means to each of said pipe sections in supporting relation, raising the pipe sections to the desired level by operation of said adjustable lifting means, connecting the ends of said pipe sections to form a pipe, covering a portion of said pipe between said lifting means with a plurality of structurally rigid insulation sections to form a length of tubular casing which encloses said pipe in slidable relation, wrapping said tubular casing with a heat resistant protective material to form a protective envelope, removing said lifting means adjacent to said length of tubular casing from said pipe and repositioning said lifting means around said tubular casing and protective envelope to maintain said pipe at the desired level, continuing the construction of said tubular casing and said protective envelope until the entire length of pipe is enclosed in slidable relation to form an insulated conduit at the desired level and grade, filling said ditch until said insulated conduit is supported by said fill, removing said lifting means from said insulated conduit, filling said ditch to cover said insulated conduit.

2. The method described in claim 1 wherein the heat resistant protective material has an adhesive coating on one side thereof, and wherein said protective material is wound around the tubular casing in overlapping relation with said adhesive coating facing inward to provide a mechanically strong, substantially moisture-proof envelope.

3. The method described in claim 1 wherein the heat resistant protective material comprises a plurality of strips, and wherein the ends of said strips are covered with an adhesive sealer and overlapped to form a mechanically strong, substantially moisture-proof envelope.

4. The method of constructing an insulated conduit for the underground distribution of fluids which comprises, excavating a ditch deeper than the desired lower line of the conduit, placing a necessary number of pipe sections in said ditch, placing supporting members across said ditch, attach a first short chain to each supporting member above the desired center line of said conduit, placing a sling having a pair of support rings around the pipes beneath each first chain, placing the hook of a second short chain through the support rings of each of said slings, raising the pipes to the desired level and grade by means of chain jacks used in conjunction with said first and second short chains, connecting the ends of said pipe sections to form a pipe, covering a portion of said pipe between said slings with a plurality of structurally rigid insulation sections to form a length of tubular casing which encloses said pipe in slidable relation, wrapping said tubular casing with a heat resistant protective material to form a protective envelope, removing the slings adjacent to said length of tubular casing from said pipe and repositioning said slings around said protective envelope to maintain said pipe at the desired level and grade, continuing the construction of said tubular casing and said protective envelope until the entire length of pipe is enclosed in slidable relation to form an insulated conduit, filling said ditch until said insulated conduit is supported by said fill, removing said slings from said insulated conduit, filling said ditch to cover said insulated conduit.

References Cited by the Examiner
UNITED STATES PATENTS

| | | | |
|---|---|---|---|
| 1,600,701 | 9/1926 | Sommer | 61—72.1 |
| 2,355,966 | 8/1944 | Groff | 138—100 |
| 2,707,984 | 5/1955 | Groff | 138—106 X |
| 2,987,981 | 6/1961 | Phillips | 61—72.1 |
| 3,101,530 | 8/1963 | Coscia | 61—72.1 X |

EARL J. WITMER, *Primary Examiner.*